(No Model.)
L. B. RUSSELL.
COUNTER STIFFENER MACHINE.
No. 377,468. Patented Feb. 7, 1888.
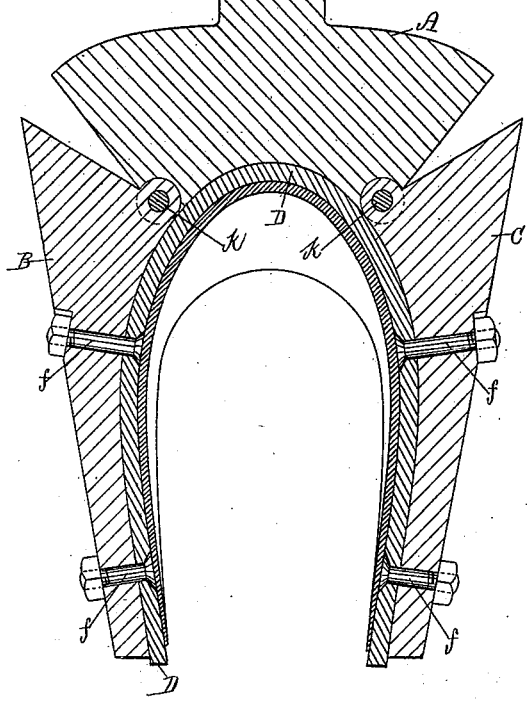
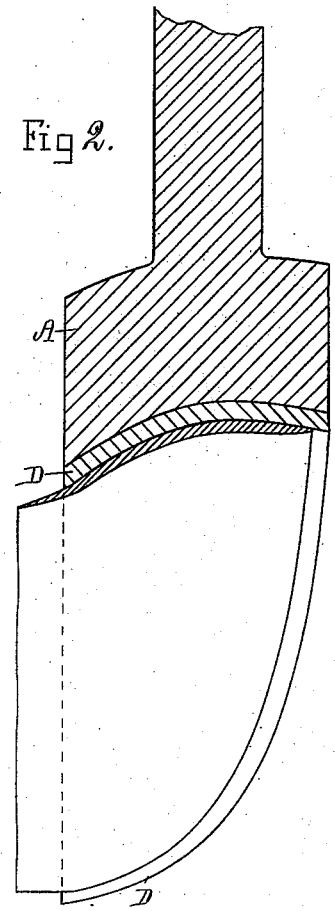

UNITED STATES PATENT OFFICE.

LEWIS B. RUSSELL, OF LYNN, MASSACHUSETTS, ASSIGNOR TO THE RUSSELL COUNTER COMPANY, OF SACO, MAINE.

COUNTER-STIFFENER MACHINE.

SPECIFICATION forming part of Letters Patent No. 377,468, dated February 7, 1888.

Application filed August 15, 1887. Serial No. 246,927. (No model.)

*To all whom it may concern:*

Be it known that I, LEWIS B. RUSSELL, of Lynn, county of Essex, State of Massachusetts, have invented certain new and useful Improvements in Counter-Stiffening Machines, of which the following is a specification, reference being had to the drawings accompanying and forming a part hereof, in which—

Figure 1 is a horizontal sectional view, and Fig. 2 is a vertical sectional view, of a common form of mold such as is in use in machines for shaping boot or shoe counters, showing my improvement attached.

In the drawings I have shown only the outer or female mold, since the other parts of the machine are familiar to those skilled in the art, and reference to them is not necessary in describing my present improvement.

It will also be understood that I have shown in the drawings but one form of mold, although my improvement is applicable to any of the forms of mold known to me, and its application to any of these forms will be obvious.

The female molds of counter-shaping machines which act on the exterior of the counter are usually constructed in two or more parts, and are known to the trade as "divided" molds. They are thus divided because the form to which the counter is molded, and on which the counter-blank is placed to be acted upon by the divided mold, is of a heel shape, and being narrower at the shank part of the heel than midway of the heel, the female mold must open to receive the heel-shaped form, and after it has been closed upon it to mold the counter thereon it must be opened again to allow the heel-shaped form to be withdrawn. This dividing of the mold causes a seam or joint where the parts of the mold come together, and when the mold acts upon the counter a crease or mark appears thereon at the point where the joint in the mold occurs. These creases or ridges are objectionable, since the whole exterior of the counter should be smooth in order to produce the best results. The divided molds are usually made of iron, and after use for a time on such material as leather or leather-board, of which counters are made, they become worn irregularly, their interior shape becomes modified to a greater or less extent, and they do not act uniformly over the surface of the counter. My improvement has for its object the remedying of these defects, as also the attainment of certain other advantages, which will be hereinafter referred to; and it consists in the application to the female mold of a lining or interior layer of material having greater or less flexibility.

My improvement and the mode I have used of applying it will be readily understood from the following description, to which reference is made in the accompanying drawings.

The parts marked A B C are respectively the back and sides of a three-part divided mold, the sides B and C being hinged, as shown at *k*, Fig. 1, to the back piece, A.

D is the lining, of somewhat yielding flexible material, which I secure by means of the screw-bolts *f* to the sides of the mold.

The precise method of securing the lining in position is not important so long as its interior surface is smooth. The layer D of yielding and flexible material is continuous, and I prefer for the purpose rawhide or leatheroid, since these materials may be conveniently given the exact shape required, and are very tough and hard, keeping their shape well and wearing with great smoothness and uniformity. The layer D may be easily fitted to the shape of the mold or to the exact shape of the counter required for a given style or class of goods by wetting a piece of the material, and while it is moist and pliable fitting it closely onto the form or last and drying it in that position; or it may be rolled into shape when dry or molded by means of molds of the ordinary construction. After being given the required shape it is applied to the interior of the mold and secured by the bolts *f*, as heretofore described, or in any other convenient manner. When lining of this kind is used in a divided mold, the hinges or pivots *k* may be dispensed with, the flexible lining forming a sufficient hinge.

When it is desired to very slightly modify the contour of the counter produced, this may be done without changing the mold by removing the lining or layer D and substituting another lining which has been fitted to the modified shape, thus effecting a saving in time and expense in adapting the machine to a slightly different form of counter.

A smooth and highly-finished surface is considered desirable for the exterior of a molded counter, and a counter made from resilient material like leather or leather-board so finished will keep its shape better than one which is not so finished. I have been enabled by the use of my improved lining to obtain counters of a higher finish than any now known to me.

I do not desire to be understood as limiting myself to a lining consisting of a continuous layer in the sense of a layer that is integral throughout; nor do I wish to limit myself to the application of my improvement to what are usually called "divided molds," as it may be successfully employed in sectional or double-process molds, such as are shown in Letters Patent No. 292,514, granted to N. J. Simonds, dated January 29, 1884. In molds of the kind last named the superior surface finish which the counters receive from contact with the rawhide lining will be very apparent.

I am aware that molds for counter-machines have heretofore been lined with metal, and I therefore disclaim metal as a lining for such molds. It has, however, been found in practice that a lining of yielding and flexible material—such as rawhide or leatheroid—gives a better finish to the counters than can be secured by a lining of metal, as it yields somewhat to compensate for the unequal thickness of the stock to be compressed in forming the counters, and its elasticity or compressibility also contributes to an improved finish of the counters. The rawhide or leatheroid is also more easily molded or fitted into proper shape for the mold-lining than metal.

What I claim is—

A divided or sectional mold for counter-machines having a smooth and continuous interior layer or lining of rawhide or leatheroid attached to the mold and closely fitting against and covering the entire interior thereof, substantially as set forth.

LEWIS B. RUSSELL.

Witnesses:
WM. A. MACLEOD,
M. A. THOMPSON.